Patented Dec. 6, 1932

1,890,230

UNITED STATES PATENT OFFICE

JACQUE C. MORRELL AND JESSE L. ESSEX, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

REFINING OF HYDROCARBON OIL

No Drawing. Application filed November 5, 1928. Serial No. 317,476.

This application is a continuation in part of our application Serial No. 245,625, filed January 9, 1928.

This invention relates to the refining of hydrocarbon oil, and refers more particularly to the treatment of hydrocarbon oil to remove therefrom, or convert therein, gummy components or other deleterious compounds contained therein, or gum forming or color forming, or other materials which might react to form undesirable compounds.

In its broad aspects the invention is directed to the treatment of distillates comprising the condensed overhead product of hydrocarbon oil distillation, and in its more specific aspects it is directed to the treatment of cracked distillates produced from the subjection of hydrocarbon oil to conversion conditions of heat in liquid phase or vapor phase processes.

The invention has been found to be of particular utility in connection with the degumming of distillates produced from vapor phase cracking processes.

The invention contemplates the use of borax ($Na_2B_4O_7$) either as the sole refining agent in the refining of oils, or to be used in conjunction with any of the well known refining agents normally used to convert or remove deleterious compounds contained in oils. The borax may be incorporated with the oil either in dry form or in the form of an aqueous solution. The inventive concept of the invention, therefore, comprises the distillation or heating of distillates in the presence of borax.

Illustrative of one embodiment of the invention, a cracked distillate produced by the vapor phase cracking process had incorporated with it dry borax on the basis of approximately one pound of borax per barrel of distillate treated. The borax was introduced into the oil while the latter was at approximately atmospheric temperature and incorporated in the oil by stirring or other suitable agitation. The mixture was then subjected to heat, the temperature gradually being permitted to rise to approximately 300° F. During this heating period distillation resulted, the vaporous products of distillation (corresponding to specifications for gasoline motor fuel) being removed as desired. The gasoline produced from the original distillate before treatment showed a gum content of 700 milligrams per 100 cc's. The gasoline produced from the oil having been treated with borax showed a gum content of 75 milligrams per 100 cc's, indicating a very marked reduction in undesirable gummy components. The color of the gasoline from the borax treatment was plus 28, while the gasoline distilled over from the distillate without borax was 18 color. In comparison the same oil was distilled over fuller's earth which effects a marked color reduction and showed only 22 color.

As another example, a treated vapor phase cracked distillate distilled over fuller's earth showed a gum reduction from 880 to 191 milligrams per 100 cc's. When distilled over borax the same sample was reduced from 880 to 94 milligrams per 100 cc's. The color of the sample distilled over borax was plus 15, while that distilled over fuller's earth was 10. When distilled over a mixture of borax and clay, or generally speaking, earthy adsorbents, or fuller's earth, a color of 21 was obtained with the same material, indicating that in some instances a mixture of borax with fuller's or other active clay resulted in a better product than the use of borax or clay alone. In this latter treatment, one-half pound of borax was used with one-half pound of clay, the mixture comprising approximately one pound per barrel of distillate treated.

It is to be understood that we do not wish to limit the invention to the particular proportions of degumming and decolorizing medium specified, since these proportions may vary widely, being conditional upon the distillate treated and the amount of degumming or decolorization necessary.

Preferably, distillation is carried on in the presence of steam in direct physical contact with the distillate.

The foregoing illustrations describe the use of dry borax. It is to be understood that the borax may be introduced in the form of an aqueous solution, in which event the concentration of borax shall be such that the amount necessary is introduced. Preferably, however, when the active clays are used with the borax the latter is not to be dissolved in water.

The borax, or borax-clay treatment, may precede or succeed any or all of the usual refining treatments, such as the treatment with sulphuric acid, with caustic soda, with litharge dissolved with caustic soda, fuller's earth, or the like. The best results up to the present time have been secured in distilling distillates which have been previously subjected to acid treatment. In addition to accomplishing the object of the present invention, the use of borax is advantageous in view of its economy, it being relatively inexpensive.

We claim as our invention:

1. A step in a process of refining cracked hydrocarbon distillates to remove gummy compounds, comprising subjecting said distillates to heat in the presence of a mixture of borax and adsorbent of the clay type under temperature conditions adequate to effect such removal.

2. A step in a process of refining cracked hydrocarbon distillates to remove gummy compounds which comprises subjecting said distillates to the action of a mixture of borax and adsorbent of the clay type under temperature conditions adequate to effect such removal.

3. A step in a process of refining cracked hydrocarbon distillates to remove gummy compounds which comprises distilling said distillates over a mixture of borax and adsorbent of the clay type under temperature conditions adequate to effect such removal.

4. A step in a process of refining cracked hydrocarbon distillates to remove gummy compounds which comprises distilling said distillates over a mixture of borax and adsorbent of the clay type under temperature conditions adequate to effect such removal and in the presence of steam.

5. A step in a process of refining vapor phase cracked hydrocarbon distillates to remove gummy compounds, comprising subjecting said distillates to heat in the presence of a mixture of borax and adsorbent of the clay type under temperature conditions adequate to effect such removal.

6. A step in a process of refining vapor phase cracked hydrocarbon distillates to remove gummy compounds which comprises subjecting said distillates to the action of a mixture of borax and adsorbent of the clay type under temperature conditions adequate to effect such removal.

7. A step in a process of refining vapor phase cracked hydrocarbon distillates to remove gummy compounds which comprises distilling said distillates over a mixture of borax and adsorbent of the clay type under temperature conditions adequate to effect such removal.

8. A step in a process of refining vapor phase cracked hydrocarbon distillates to remove gummy compounds which comprises distilling said distillates over a mixture of borax and adsorbent of the clay type under temperature conditions adequate to effect such removal and in the presence of steam.

JACQUE C. MORRELL.
JESSE L. ESSEX.